M. DZWONKA.
TROLLEY POLE.
APPLICATION FILED APR. 6, 1915.
1,188,256.
Patented June 20, 1916.
3 SHEETS—SHEET 1.
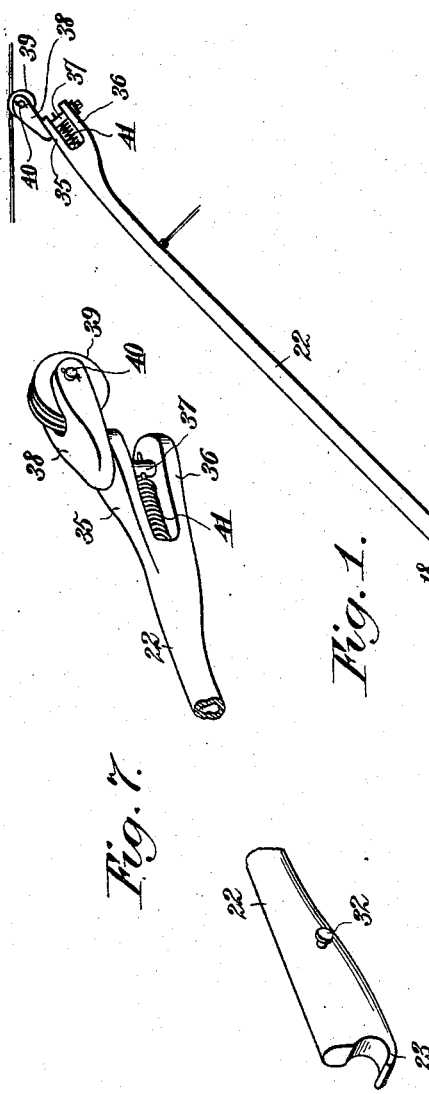
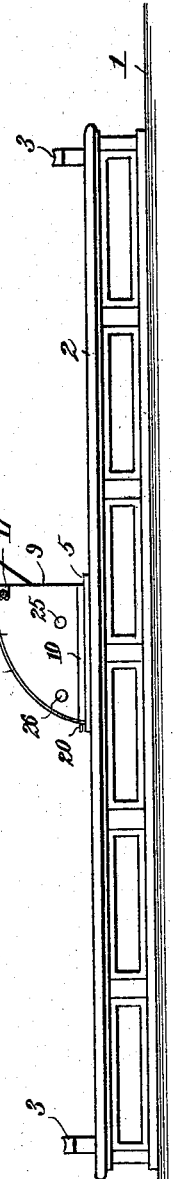
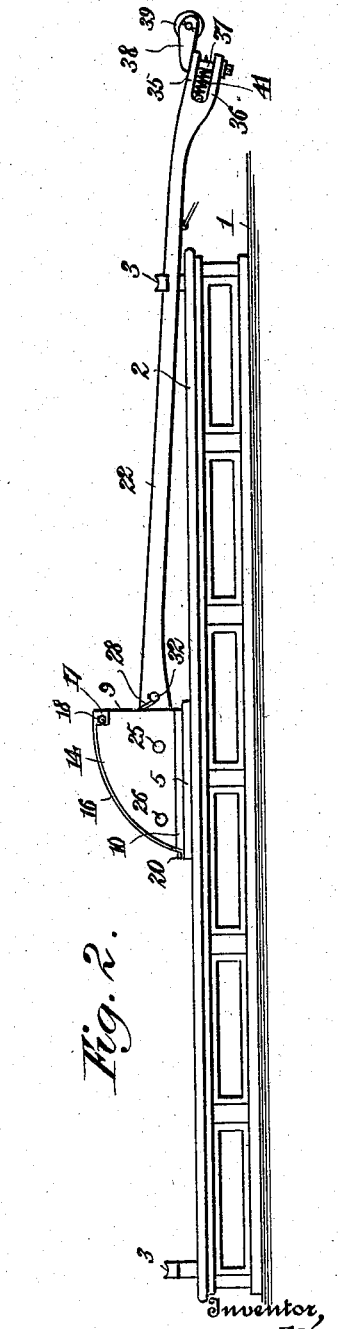

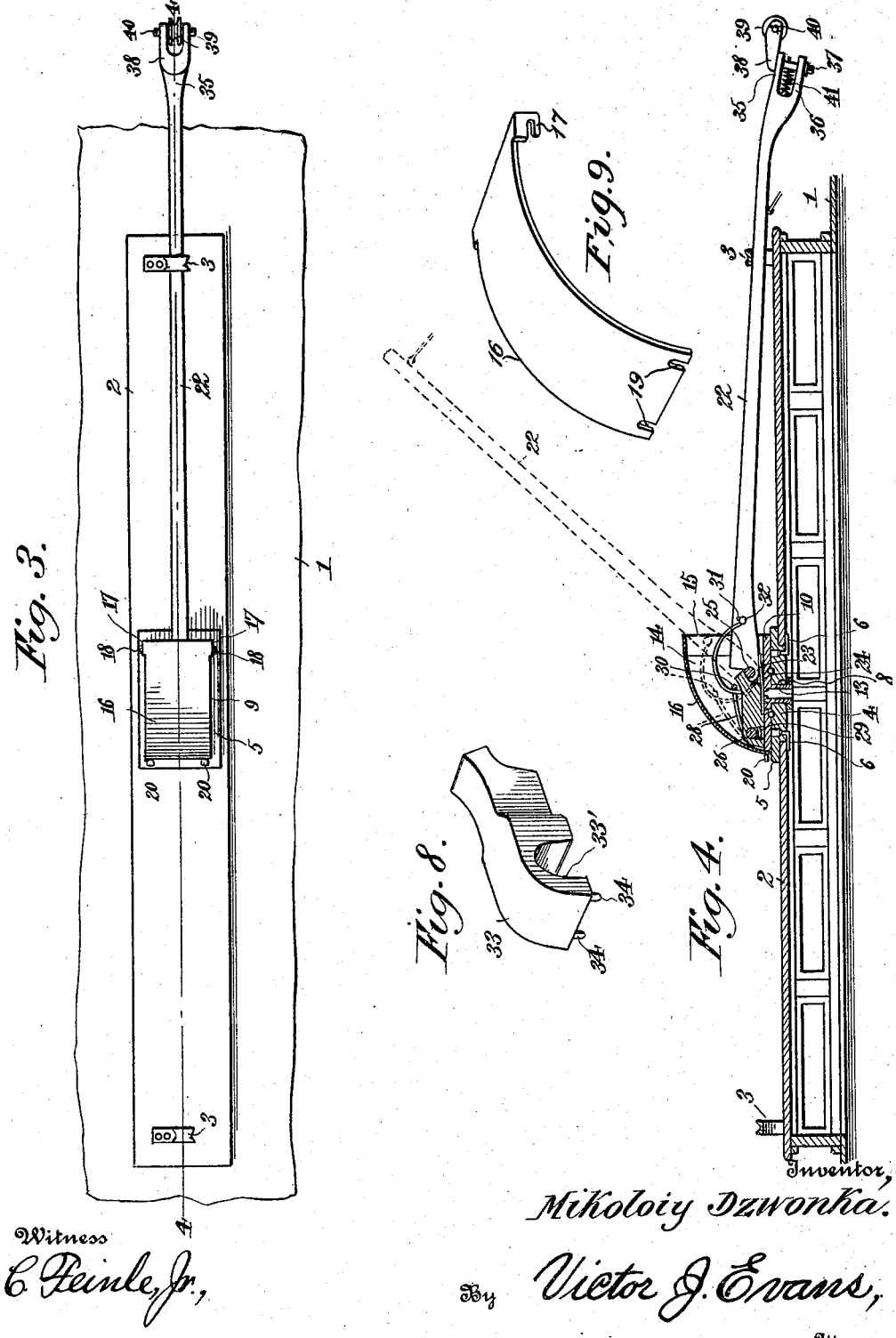

M. DZWONKA.
TROLLEY POLE.
APPLICATION FILED APR. 6, 1915.

1,188,256.

Patented June 20, 1916.
3 SHEETS—SHEET 3.

Witness
C. Peinle, Jr.

Inventor,
Mikoloiy Dzwonka.
By Victor J. Evans,
Attorney.

UNITED STATES PATENT OFFICE.

MIKOLOIY DZWONKA, OF MEDINA, NEW YORK, ASSIGNOR OF ONE-FOURTH TO GIOVANI SILVESTEI, OF MEDINA, NEW YORK.

TROLLEY-POLE.

1,188,256.  Specification of Letters Patent.  Patented June 20, 1916.

Application filed April 6, 1915. Serial No. 19,499.

*To all whom it may concern:*

Be it known that I, MIKOLOIY DZWONKA, a citizen of the United States, residing at Medina, in the county of Orleans and State of New York, have invented new and useful Improvements in Trolley-Poles, of which the following is a specification.

The present invention relates to improvements in trolley poles, and one of the objects of the invention is to provide a trolley pole having a trolley wheel so arranged thereon as to effectively contact with the trolley or feed wire regardless of curves or obstructions in the said wire.

Another object of the invention is to provide a novel form of housing for the base or trolley pole having arranged therein spring means which will swing the trolley in one direction to effectively sustain the trolley wheel in engagement with the wire.

A further object of the invention is to provide simple and effective means for holding the trolley pole upon the top of the car when an underground power is employed for propelling the car.

With the above and other objects in view, the improvement resides in the construction, combination and arrangement of parts set forth in the following specification and falling within the scope of the appended claims.

Figure 5:
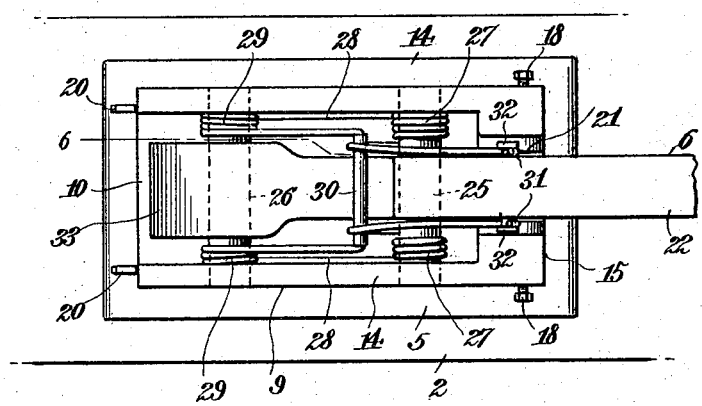
Figure 6:
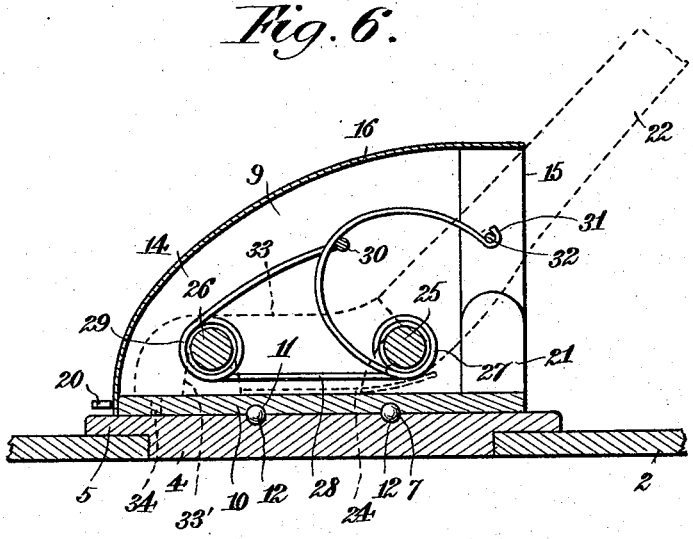

In the drawings: Figure 1 is a side elevation of the top portion of the car and a trolley pole arranged thereon constructed in accordance with the present invention, the wheel of the pole engaging with the trolley wire, Fig. 2 is a similar view illustrating the pole swung away from the wire and secured upon the top of the car, Fig. 3 is a top plan view of the device as illustrated in Fig. 2, Fig. 4 is a vertical longitudinal sectional view on the line 4—4 of Fig. 3, the dotted lines illustrating the arrangement of parts when the pole is swung to bring its wheel into wire engaging position, Fig. 5 is a detail top plan view with the cap of the base member removed, and Fig. 6 is a longitudinal sectional view approximately on the line 6—6 of Fig. 5. Fig. 7 is a perspective view of the trolley pole, the central portion of the same being broken away, and Fig. 8 is a similar view of the spacing block. Fig. 9 is a detail view illustrating the manner in which the top plate is connected with the housing.

Referring now to the drawings in detail, the numeral 1 designates a portion of an ordinary trolley car which has arranged centrally upon the top thereof a longitudinally extending board 2, the opposite ends of said board being provided with spring hooks 3—3. The board is centrally formed with a substantially rectangular depression which is adapted to receive the reduced lower portion 4 of a flat base plate 5, the said plate being secured within the openings through the medium of rotatable clamps 6. The upper face of the base plate 5 is provided with a raceway 7 which is arranged to surround a central opening 8 and this opening is provided for the car conductor wires.

The numeral 9 designates what I term the housing for the lower portion of the trolley pole, and this housing includes a flat base or bottom portion 10 which is adapted to rest upon the flat upper face of the base plate 5, the said bottom being formed with a raceway 11 and anti-frictional balls 12 arranged within the registering raceways 11 and 7, and a suitable pivot 13 carried by the base 10 passes through the opening 8 and secures the housing 9 upon the plate 5. The housing also includes parallel side walls 14—14, the said sides being rounded from what I will term the outer face of the housing, indicated by the numeral 15 to the lower ends of the sides, and the rounded and open top is normally closed by a plate 16. The plate 16 is provided at its upper end with hooks 17 which are adapted to engage with laterally extending studs 18 provided upon the sides 14 adjacent the upper corners thereof, while the lower edge of the round plate 16 is provided with a pair of longitudinally arranged slots 19—19 which are adapted to receive the shanks of headed members 20, the said headed members being secured to the lower and outer edge of the base or bottom 10 of the housing 9.

The portion of the housing which I have referred to as the outer or front face and indicated by the numeral 15 is also open, but the lower portion thereof is of a less width or has its walls spaced closer together than that of the upper portion of the said front, and the lower or restricted opening of the front, indicated by the numeral 21, is adapted to receive the lower end of the trolley pole 22. The said lower end of the trolley pole is provided with a rounded lip 23 which is adapted to engage with a spring conducting plate 24 and to force the outer and rounded end of the same against a transverse shaft 25 supported directly to the rear of the front wall of the housing between the sides 14 thereof. A second shaft 26 is arranged between the said sides to the rear of the said housing, and coiled around the shaft 25 are the oppositely arranged convolutions 27—27 of a spring 28. The arms of the spring are continued longitudinally and wound around the second shaft 26, as indicated by the numerals 29, and the end strands of the wire spring are brought forward in the housing in the shape of a U-shaped member, the ends of the forwardly extending portions being connected, as at 30. The opposite ends of the convolutions or coils 27 upon the shaft 25 are brought rearwardly over the connecting member 30, and the ends of these members are bent upon themselves to provide hooks 31—31, and each of these hooks is adapted to engage with a laterally extending lug 32 upon the opposite sides of the trolley pole 22.

In order to space the arms of the spring provided with the hooks 31 as well as to space the arms of said springs terminating in a connecting member 30, I provide what I term a spacing block 33, the said block having its lower face recessed at one of its ends, as at 33', so that the same will straddle the shaft 26 and its opposite end is concaved to engage with the rear face of the shaft 25. The block 33 is provided upon its rear end with depending fingers 34 which enter suitable openings in the base of the housing and by such an arrangement it will be readily noted that the tension of the spring engaging with the trolley pole is sufficient to at all times normally force the said pole in a vertical direction, the movement in the said direction being limited by the contact of the pole by the closing plate 16 of the housing, and by providing the anti-frictional members between the housing and the base plate 5, it will be noted that the trolley pole may be readily swung toward either end of the car. Furthermore, it will be noted (see Fig. 2) that the hooks 3 are employed to sustain the trolley pole horizontally upon the top of the car when the current is brought from an underground source.

The trolley pole has its free end provided with a laterally arranged slot providing the same with upper and lower spaced arms or portions 35 and 36 respectively, and trunnioned in suitable openings in the said arms is a normally vertically disposed shaft 27, the said shaft having its upper end secured to an ear or fork 38, and a trolley wheel 39 is mounted for rotation upon the shaft 40 that passes transversely through the ears and through the members of the fork 38.

The numeral 41 designates a spring which may be also in the nature of a conducting member, and which is secured to the shaft and to the trolley pole, said spring exerting its tension in a manner as to almost retain the trolley wheel longitudinally straight with respect to the fork upon which it is mounted for rotation. By such an arrangement it will be noted that while the trolley wheel may readily swing laterally with respect to the trolley pole, the same will follow the feed wire irrespective of the curves or any irregularities in the feed wire.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. The combination with a car, of a board arranged longitudinally upon the top of the car, hooks upon the opposite ends of the board, a removable base plate centrally arranged in an opening in the board, a housing arranged upon the base plate, anti-frictional bearings between the plate and housing, said housing having an open top and an open front, a removable cap for the top, a spring within the housing, a trolley pole having one of its ends arranged within the housing, said spring having two of its arms engaging with the opposite sides of the trolley pole to sustain the end thereof between the housing and to normally elevate the pole with relation to the housing.

2. In a device for the purpose set forth, a revoluble housing having an open front and an open top, a removable cap for closing the top, shafts passing laterally through the housing and disposed adjacent the front and rear thereof, a spring having convolutions wound around the front shaft and continued rearwardly of the housing and wound around the rear shaft and extended to provide a U-shaped end, the opposite ends of the spring upon the convolutions upon the first mentioned shaft and through the open front of the housing, a spacing block for sustaining the arms of the spring in spaced relation with each other, a spring contact plate upon the bottom of the housing, a trolley pole having its lower end hooked and contacting the said plate to force the same against the front shaft, said trolley pole having laterally extending studs, the last mentioned spaced arms of the spring having their ends provided with hooks which engage with the studs, and a trolley wheel for the trolley pole.

In testimony whereof I affix my signature in presence of two witnesses.

MIKOLOIY DZWONKA.

Witnesses:
   IRVING L'HOMMEDIM,
   EDWARD H. GLEASON.

Copies of this patent may be obtained for five cents each, by addressing the "Commissioner of Patents, Washington, D. C."